US006776178B1

(12) United States Patent
Glynn et al.

(10) Patent No.: US 6,776,178 B1
(45) Date of Patent: Aug. 17, 2004

(54) MECHANIZED FUMIGATION TENT HAVING A PLURAL CLEW SYSTEM WITH COMPOSITE CLOSING STRUCTURE

(76) Inventors: Kenneth P. Glynn, 29 Plennert Rd., Flemington, NJ (US) 08822; Christopher D. Langhart, 5872 Ridge Rd., New Hope, PA (US) 18938

( * ) Notice: Subject to any disclaimer, the term of this patent is extended or adjusted under 35 U.S.C. 154(b) by 0 days.

(21) Appl. No.: 10/427,837

(22) Filed: May 1, 2003

(51) Int. Cl.[7] .............................................. E04H 15/54
(52) U.S. Cl. ...................................... 135/115; 52/63
(58) Field of Search ....................... 52/222, 111, 122.1, 52/3, 5, 83; 135/908, 123, 905; 133/90, 156, 115; 160/19; 422/28, 32, 33, 292, 294, 306; 426/320, 331, 333, 335; 43/124, 125, 126, 127

(56) References Cited

U.S. PATENT DOCUMENTS

| 645,890 | A | | 3/1900 | Conrad |
|---|---|---|---|---|
| 4,033,367 | A | | 7/1977 | Johnston |
| 4,192,333 | A | * | 3/1980 | Sato ........................... 135/124 |
| 4,229,914 | A | | 10/1980 | Lucas |
| 5,479,744 | A | * | 1/1996 | Meyer ........................... 52/63 |
| 5,520,236 | A | * | 5/1996 | Thomas et al. ............. 160/120 |
| 5,641,463 | A | | 6/1997 | Langhart |
| 5,918,614 | A | | 7/1999 | Lynch |
| 5,964,236 | A | | 10/1999 | Berke |
| 5,974,740 | A | | 11/1999 | Park |
| 6,260,308 | B1 | * | 7/2001 | Looney ........................... 52/63 |
| 6,273,115 | B1 | * | 8/2001 | Guggisberg ................. 135/135 |
| 6,422,253 | B1 | * | 7/2002 | Glynn et al. ................ 135/115 |
| 6,450,188 | B1 | * | 9/2002 | Langhart .................... 135/115 |
| 6,502,593 | B1 | * | 1/2003 | Stafford ..................... 135/115 |
| 2003/0074845 | A1 | * | 4/2003 | Sample et al. ................ 52/63 |

\* cited by examiner

Primary Examiner—Peter M. Cuomo
Assistant Examiner—Stephanie Harris
(74) Attorney, Agent, or Firm—Kenneth P Glynn, Esq.

(57) ABSTRACT

The present invention provides a mechanized fumigation tent having a plural suspension system with composite closing structure. It includes an overhead structure; support frame having top; a tarp mounted atop the frame and hanging from the frame to define top and side curtains, the curtains having a lower periphery which defines a bottom perimeter; and first plurality of cables, being curtain cables, and communicating with the overhead structure. The curtain cables are functionally connected to side curtains and adapted for raising and lowering side curtains relative to support frame. There is second plurality of cables, being frame cables, and communicating with the overhead structure and being connected to the frame and adapted to raise and lower the curtains by raising and lowering the first plurality of cables, and so as to raise and lower the frame and the tarp by raising and lowering the second set of cables. There is a mechanized cable moving system for moving the first plurality of cables and the second plurality of cables, and a composite closing structure for sealing tarp to the floor, having a structural support component and sealing component.

19 Claims, 11 Drawing Sheets

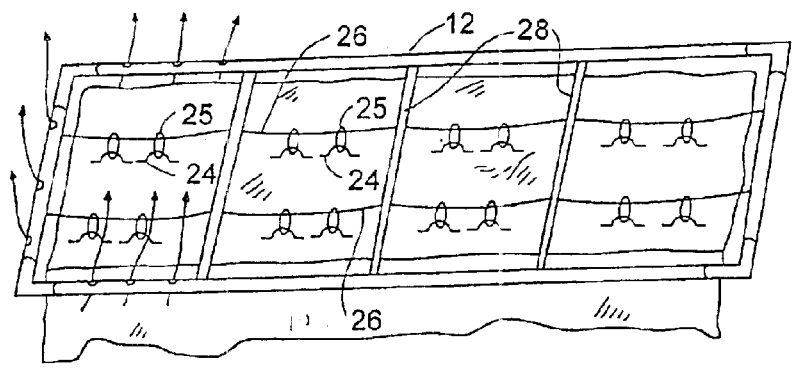
FIG. 3 PRIOR ART
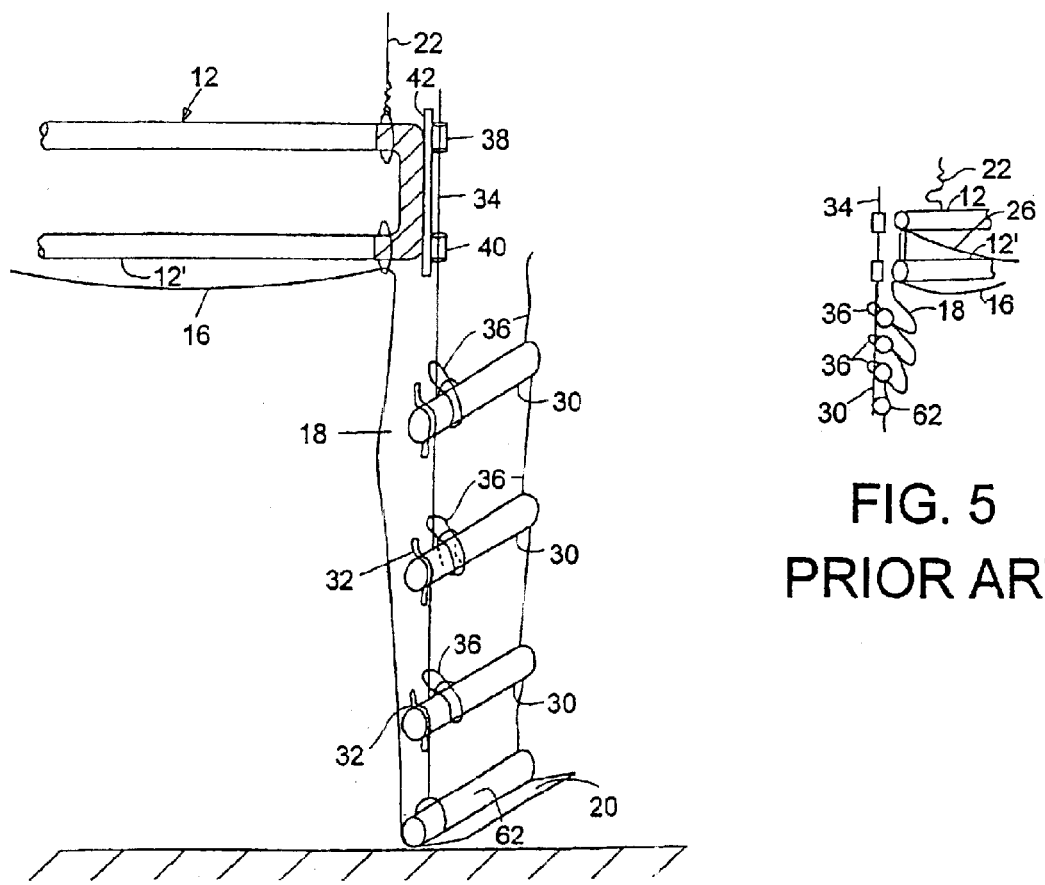
FIG. 5 PRIOR ART
FIG. 4 PRIOR ART

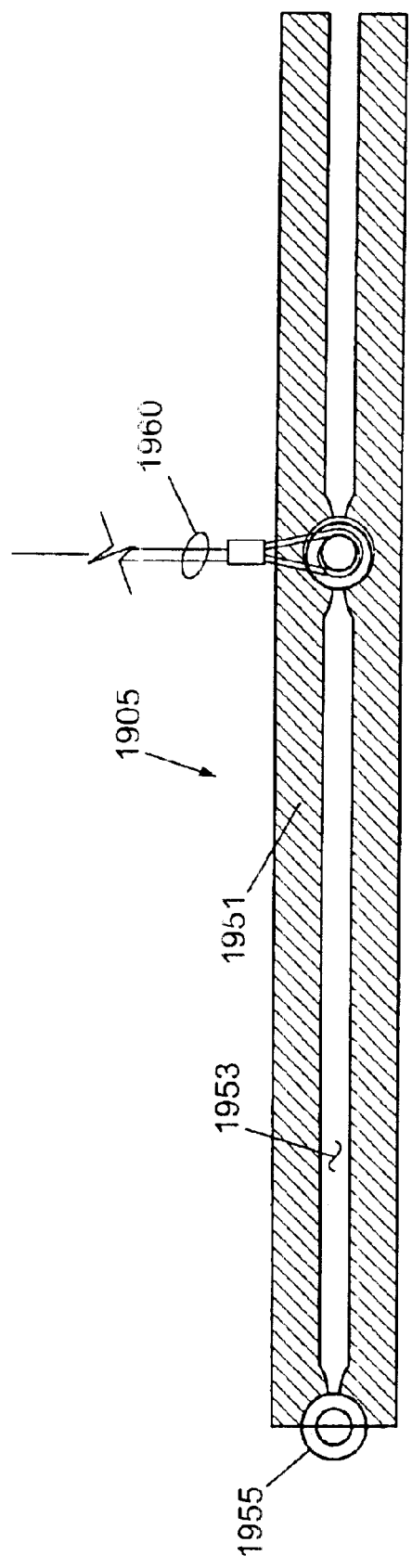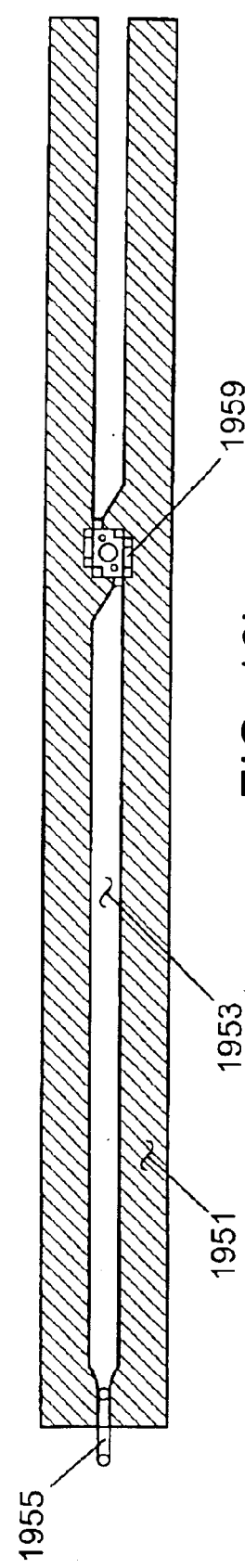
FIG. 16a
FIG. 16b

MECHANIZED FUMIGATION TENT HAVING A PLURAL CLEW SYSTEM WITH COMPOSITE CLOSING STRUCTURE

BACKGROUND OF THE INVENTION

1. Field of the Invention

The present invention relates to a mechanized tent. In particular, it relates to a mechanized tent having a frame and a collectable tarp attached to the frame which can be raised and lowered over pallets of produce or the like, particularly useful for fumigation of produce, e.g. imported products. Furthermore, it relates to those tents, which have a plural crew system for elevating and lowering the tarp, as well as including a composite closing structure for sealing the tarp to a floor.

2. Information Disclosure Statement

Once fumigated, produce has a shelf life of at most ten days to two weeks. It is therefore desirable to fumigate the produce close to the place where it will be ultimately sold. For imported produce, this place is typically inside a dock building or warehouse located at a port of entry. Pallets of the produce are unloaded from a ship and placed or staged on the floor of the dock building.

Known methods of fumigating produce involve covering the pallets of produce with a polyethylene or plastic impregnated tarpaulin and then introducing a gas, e.g., methyl bromide, or other gas(+) atmosphere under the tarp to kill live insect infestations. Workers climb on top of the pallets or use poles to pull the tarp over a group of pallets. Because it is necessary for the gas to circulate freely on all sides and the top of the pallets, the tarp cannot lay directly on the top of the pallets. The United States Department of Agriculture requires that a space of about two feet be provided on the top of the pallets, and at least two feet on their sides to allow room for the placement of fans to facilitate the circulation of the fumigation gas. The fans may be tied down with rope to prevent them from moving. Several hoses for introducing the gas is secured to the top of selected fans. The volume of space under the tarp, i.e., the total cubic feet, determines how many fans and points of introduction are required.

One method for maintaining the required space on the top of the pallets is to erect wood frames in the shape of a "T" or an "A" at each corner and attach rope between each "T" or an "A" to create a web of support for the tarp. The side space is maintained by draping the tarp outward as it contacts the floor of the dock building and securing it in that position by placing flexible vinyl tubes (approximately 6" in diameter and 4' long) filled with sand on top of the edge of the tarp. At least 2 feet of excess tarp remains beyond the sand tubes.

The steps involved in pulling the tarp over the pallets, setting up the fans, attaching the introduction hoses to the fans, handling hundreds of tubes of sand, and dismantling and storing all of the above equipment, and repeating the process upon completion, require many labor intensive hours.

Improvements to the conventional method of fumigating produce include permanently suspending the tarpaulin from an overhead frame and lowering the frame over the pallets as needed. Such a frame may be made from welded trusses to form a disassemble one piece unit of varying dimensions. The typical frame size may be 50 feet long by 250 feet wide, but may be larger or smaller depending upon the spacing between support columns in the dock building. To the underside of the frame a tarpaulin is attached which has been manufactured with grommets, i.e., tabs and eyelets, specific to the frame it hangs from.

The frame may be raised and lowered by a system of cables and pulleys located above the unit which are attached to exposed barjoists on the underside of the roof of the dock building. The cables are connected to hand-operated or motor-operated winces mounted on the support columns in the dock building. Workers simultaneously crank the winches to lower or raise the frame to a height above the pallets that allows the required 2 feet of space between the tarp and pallets of produce.

A typical tent can be lifted by twelve or more active pickup points. Between each of these points two counterweight sandbags are deployed to offset the self-weight of the frame and the polyethylene enclosure. Each truss section of the frame spans approximately fifty feet with two mid-point sandbags. These tend to become hung up from friction and pull at an angle to prevent the sandbag from lowering onto the polyethylene enclosure as it is elevated.

A difficult and time-consuming job associated with operating such a system is gathering up the tarp, which overhangs from the sides of the frame before the frame is raised. This is necessary because the typical dock building height of about twenty-two feet is limited to about eighteen feet by overhead piping, electrical conduits, etc. When the support frame is raised to the maximum height permitted by these obstructions the tarp hangs down low enough to catch the tops of forklift trucks as they move the pallets of produce in and out of the tent area.

One known way of gathering up the tarp on the sides is to run horizontal plastic pipes through double-thickness portions of the tent walls, which form pockets. These pockets can be located at approximately one-third and two-thirds of the wall height and are tied up to the top framing with rope every ten feet or so. Pulled ropes raise the pockets and thus gather the sides of the tent. This method is also time-consuming, however, because it requires numerous tie-up procedures in order to completely raise the tent, e.g., usually at ten to twenty foot intervals around the tent perimeter.

U.S. Pat. No. 645,890 to Conrad discloses a tree-protector having a suitable mast or pole, and a bracket with two supporting arms connected with the pole one arm above another arm. There is also a pulley or sheave in the extremity of each of the arms, and a collapsible or foldable tent. A plurality of distending hoops are attached to the tent and a halyard is connected to the top of the tent and leads around the sheave in extremity of the lower arm of the bracket for bodily raising and lowering the tent and for holding it in an elevated position. Elevating cords are attached to the lower hoop and a second halyard extends over the sheave in the upper arm of the bracket for independently raising and lowering the lower end of the tent.

U.S. Pat. No. 4,033,367 to Johnston describes and illustrates a tent fumigation apparatus for placement over a building to allow fumigation of a building by introducing fumigation into the tent. The preferred tent includes pie-shaped sections, at least some of which have ties allowing sections to be tied off for reducing the size of the tent and conforming it to the shape of the building. Tube means is provided to be affixed to the bottom of the tent for sealing purposes. The tent may include a lifting structure a the top and a cover for closing an opening at the lifting structure. At least one slot is provided in the tent for entrance and egress.

U.S. Pat. No. 4,229,914 to Lucas provides a readily erectable and/or demountable building structure comprising a plurality of arch frames in vertical planes extending transversely of and spaced apart longitudinally of the building structure. Each frame has a retainer means for retaining the longitudinal beaded edges of flexible strip roofing material. The retainer means are of groove-like or channel-like form to receive the longitudinal beaded edges slidingly therein. Preferably two strips are provided between each pair of neighboring arch frames such that when in position they each extend across the space between the two arch frames of each pair with the strip's width and length dimensions directed respectively longitudinally and transversely of the building structure (and such that a gap is provided between the adjacent strip ends in the structure's roof), the strips being tensioned in the direction of their length dimension, i.e. transversely of the building structure). Preferably each strip has a shape in its unstressed state such that when tensioned in the direction of its length dimension, it adopts a configuration that is concave to the exterior of the building structure.

U.S. Pat. No. 5,641,463 utilizes many of the aforementioned improved technique features and additionally incorporates unique features, which are more fully discussed in conjunction with some of the drawings described below.

U.S. Pat. No. 5,918,614 to Lynch defines and illustrates a canopy structure, kit and method, which permits a user to custom configure a canopy shelter in almost unlimited curvilinear shapes. To accomplish this, a flexible sheet that is elastic in at least one, but preferably two dimensions may be secured over an area to be sheltered. Anchors connect the sheet either directly to the surface, such as the ground, or to an object, such as a tree or building, secured to the surface. A support pole is interposed between the surface and the sheet; and this support pole is sufficiently long to deform the sheet in the direction(s) of elasticity and thus exert a compression force on the pole. A plurality of support poles of varying lengths may be formed from identical pole selections, and base plates and dome elements may be used on the poles. The anchors are formed to engage the central portion of the sheet so that even greater design flexibility is possible. The sheet is preferably spandex and may be coated with protective materials, and it may be printed with a desired pattern.

U.S. Pat. No. 5,964,236 to Berke discloses a method and apparatus for covering cargo. The cargo is covered by use of a tarp and a frame that extends over the tarp. A number of cords are connected to the tarp and a plurality of couplers interconnect the cords to the frame. The couplers releasably connect the tarp to the frame so that the tarp can be dropped onto the cargo once the frame is moved into a position over the cargo, for example, a forklift. Preferably, the cords include free terminal end sections that can be pulled from ground level to disconnect the cords from the frame when desired, so that walking across the cargo can be avoided.

U.S. Pat. No. 5,974,740 to Park describes and illustrates an adjustable tarpaulin that can be adjusted to various predetermined lengths, and more securely fastened. The adjustability of the adjustable tarpaulin is provided by having one or more sets of valances of the top layer and valances of the bottom layer. Because the valances are free on one end, the length of each of the valance side edges may be adjusted as desired and the valances provide two different pull angles to share the load of the tarpaulin. By doing so, the adjustable tarpaulin enables the tarpaulin to be adjusted between two or more prefixed sizes. Moreover, the adjustable tarpaulin can provide the distribution of the load from more than one angle so stress and the load will be distributed over two different sets of tie points.

U.S. Pat. No. 6,422,253 to the same inventors herein provides a mechanized fumigation tent with a composite closing structure. The composite closing structure is connected to the bottom perimeter of side curtains for sealing the bottom perimeter of the side curtains. The composite closing structure has at least a first component and second component. The first component is a structural support component and has sufficient rigidity to flex no greater than 6 inches over a 10-foot length with a fulcrum weight of 100 pounds. The second component is a sealing component and is formed of flexible material. Further, the sealing component may be a flexible base mounted along the bottom perimeter for receiving, holding and releasing water from an external water supply. When the sealing component holds water, it will seal the tent to a floor. In a preferred embodiment, the structural support component is formed of a triangular cross-sectional shape. The structural support component may be embedded within the sealing component or connected to an outside of the sealing component.

U.S. Pat. No. 6,450,188 to the same inventors herein provides a mechanized fumigation tent, which includes a frame suspended from a structure by support cables, the frame having an underside; a tarp adapted to be mounted to the top side of the frame. The tarp hangs from the frame and defines a tent having a top and side curtains that have a lower periphery defining a bottom perimeter. There is also a sealing arrangement for connecting and sealing the top of the tarp to the frame; a first plurality of cables for raising and lowering the side curtains and being connected to the side curtains and to mechanism for raising and lowering the first plurality of cables; and a second plurality of cables for raising and lowering the frame and being connected to the frame and to mechanism for raising and lowering the second plurality of cables.

Not withstanding the above prior art, there is no teaching which anticipates or renders the present invention obvious. Thus, it is neither taught nor suggested to use a system with a ceiling-mounted suspended frame with a fumigation tarp position atop the support frame in a sealed fashion. Likewise, the prior art is deficient in teachings related to cooperating clews or other present invention features, as more fully developed below.

SUMMARY OF THE INVENTION

It is an object of the present invention to provide a large mechanized fumigation tent which incorporates the height of the supporting frame within the tarp structure to eliminate the extra space otherwise needed when the support structure is stacked above the gathered, stored tarp.

It is another object of the present invention to decrease the total weight needed for an efficiently operated fumigation tent.

It is also an object of the present invention to provide a fumigation tent, which does not require any water or sandbags to seal tarp side curtains onto the floor. There is a composite closing structure which includes a structural support component and sealing component that seals the side curtains to the floor.

It is yet another object of the present invention to provide a large fumigation tent for fumigating produce, logs, textiles, wood products, and other forms of potentially infested imports which can be quickly, conveniently and freely raised and lowered over pallets of the produce.

It is also an object of the present invention to provide a fumigation tent that does not interfere with the operation of forklift trucks as they move pallets of the produce in and out of a tent area and that does not require extensive curtain tie-up procedures to accomplish this.

Another object of the present invention is to provide a fumigation tent which can be raised from a single remote location so that personnel need not be near the tent area after fumigation is complete since exposure to residual gas, which may not have been evacuated from some pallet areas, is possible and can be harmful.

It is yet another object of the present invention to provide for alternative mechanisms for first lifting side curtains of the tarp and lowering the entire structure and then the side curtains of the tarp.

A further object of the present invention to provide a system which seals the tent to the floor of the dock building and which can be easily raised with tent or independently of the tent.

The present invention provides a fumigation tent which includes a frame suspended from a structure by support cables, the frame having an underside; a tarp adapted to be mounted to the top side of the frame, the tarp hanging from the frame defining a tent having a top and side curtains having a lower periphery that defines a bottom perimeter; means for connecting and sealing the top of the tarp to the frame; a first plurality of cables for raising and lowering the side curtains and being connected to the side curtains and to means for raising and lowering the first plurality of cables; a second plurality of cables for raising and lowering the frame and being connected to the frame and to means for raising and lowering the second plurality of cables.

The present invention also provides a composite closing structure connected to the bottom perimeter of side curtains for sealing the bottom perimeter of the side curtains. The composite closing structure has at least a first component and second component. The first component is a structural support component and has sufficient rigidity to flex no greater than 6 inches over a 10-foot length with a fulcrum weight of 100 pounds. The second component is a sealing component and is formed of elastomeric flexible material.

The sealing component may be flexible hosing, flexible synthetic foam, or flexible rubber. Further, the sealing component may be a flexible base mounted along the bottom perimeter for sealing the structural support component in place. When the sealing component holds the structural support component in place, it will seal the tent to a floor.

In preferred embodiment, the structural support component is formed of triangular or tubular cross-sectional shapes. In addition, the structural support component may be elongated metal sections, elongated wood sections, elongated plastic sections, and the like. The structural support component may be within the sealing component or outside the sealing component.

The present invention further provides for attachment of winch cables to a first suspension means and a second suspension means, which in turn are attached to the winches by winch chains. There is at least one master suspension means for harmonizing the movement of the first plurality of cables and at least one curtain suspension means for harmonizing the movement of the second plurality of cables. Preferably, the winches are motorized and can be operated by remote control. In addition, in a preferred embodiment, first suspension means and second suspension means are clews. (This provides an important safety advantage, because personnel do not have to be near the tent while it is being raised. Therefore, personnel can avoid being exposed to any lingering fumigation gas which is hazardous.) It is also preferable that hand winches with cables be located near the motorized winches, so that they can be attached to the clew plates to provide emergency back up in case electrical problems occur.

Other advantages and characteristics of the present invention will become apparent in view of the description and accompanying drawings that follow.

BRIEF DESCRIPTION OF THE DRAWINGS

FIG. 3 is a top planar perspective view of the frame and the cables used to support the top middle portion of the prior art tent shown above;

FIG. 4 is a partial perspective view of a side curtain of the prior art tent shown above, with the horizontal bars and rings which are used to support and collect the side curtain while it is being raised;

FIG. 5 is a side perspective view of a portion of the above-described prior art tent from U.S. Pat. No. 5,641,463 in its raised position;

FIG. 8 shows a partial, cut side view of details of the sealing and suspending system for the frame and tarp shown in FIG. 7a;

FIG. 10 shows a partial, cut perspective view of a composite closing structure for sealing the bottom perimeter of curtains, having a triangular cross section, while

FIG. 16a and FIG. 16b show a longitudinal vertical sectional view, and a horizontal sectional view, respectively of a composite closing structure of the present invention, having eyelets with a thru-bolt inserted for allowing a cable loop end to surround the thru-bolt;

DETAILED DESCRIPTION OF THE PRESENT INVENTION

Figure 1:
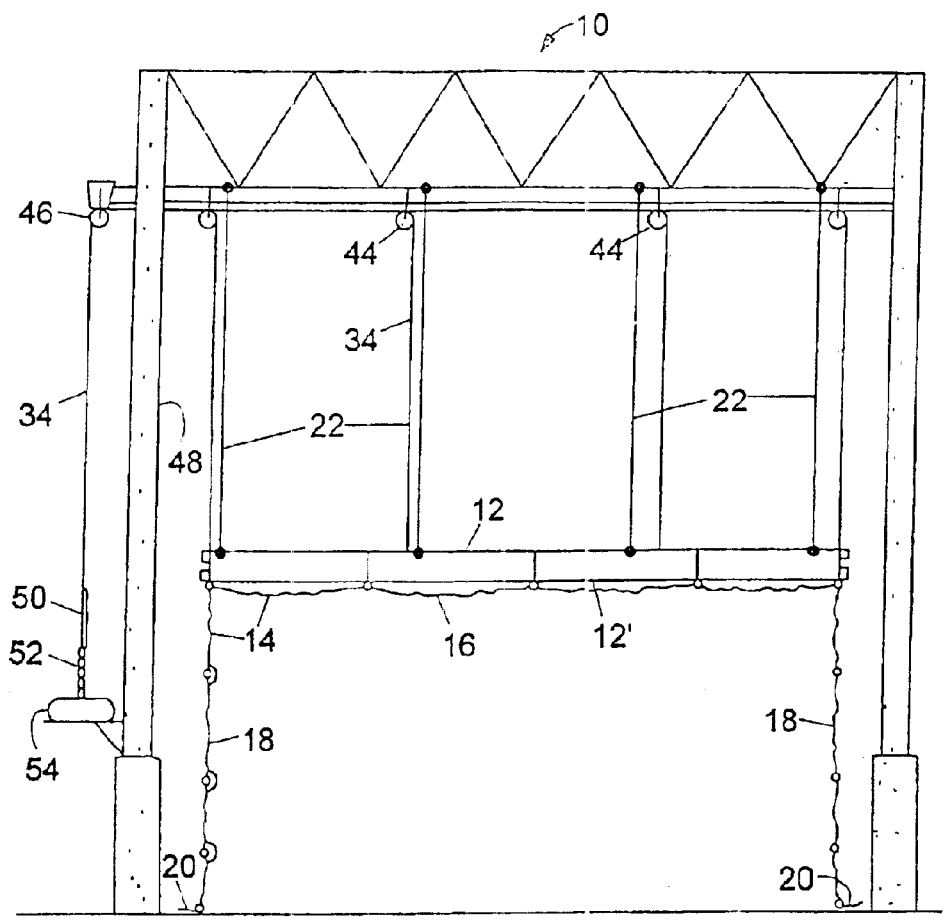
FIG. 1 is a cross-sectional schematic view of a fumigation tent in its lowered position from prior art U.S. Pat. No. 5,641,463.

Referring to the prior art drawings from U.S. Pat. No. 5,641,463 to the present invention herein, shown in the present invention as FIGS. 1 through 5, the following description is a summary thereof: In FIG. 1, a prior art apparatus for fumigating pallets of produce is indicated generally as apparatus 10. It has a support system for uniformly raising and lowering a tarp enclosure with motorized crank winches while maintaining required clearances away from the produce, as well as for relocation of frame support cables to vertical positions above the lifting position.

Figure 2:
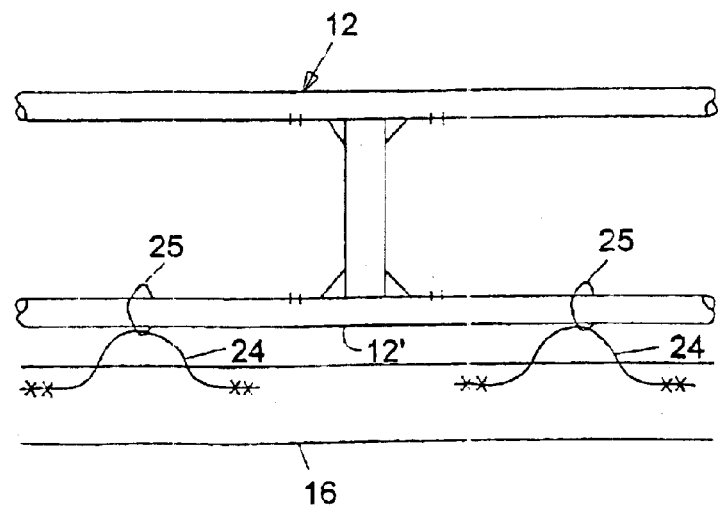
FIG. 2 is a partial side-sectional view of the frame of the tent in FIG. 1 as it is attached to the top portion of the prior art tent.

The apparatus 10 includes a frame 12 and a tarp 14 mounted to the frame underside with tabs 24 and eye rings 25. FIG. 2 shows detail of the top 16 being mounted. The tarp 14 forms a tent with flat top 16, and side curtains 18 having a lower periphery bottom perimeter 20. The frame 12 can be constructed out of steel or aluminum pipes welded and bolted together in a truss-like configuration. However, as will be recognized by those skilled in the art, the frame can be of any shape and construction which is capable of carrying the weight of the tent. The frame 12 may be, for example, suspended from the roof of a dock building or warehouse by support cables 22.

The cables 26 hang between cross bars 28, spaced so that sagging of the top 16 is reduced, usually about every fifteen feet, along cross-sections of the frame 12, as shown in FIG. 3.

Horizontal pipes 30 are fitted into tarp pockets 32 formed in double-thickness portions of the side curtains 18, as shown in FIG. 4, located just above the bottom perimeter 20; approximately one-third of the distance between the first interval and the top 16; and approximately two-thirds of the distance between the first interval and the top 16.

Winch cables 34 draw up the horizontal pipes 30. These cables pass through rings 36 attached along and at the ends of the horizontal pipes, as shown in FIG. 4. The tarp pockets 32 are gathered up by the pipes 30, and support the tarp 14 as the horizontal pipes are being raised. Each winch cable 34 passes through a pair of guide tubes 38 and 40 fixed to a plate 42 mounted on the frame 12, also shown in FIG. 4. Guide tubes 38 and 40 and plate 42 provide a means for enabling the frame to be lifted by the winch cables 34 once the horizontal pipes 30 are raised and the tarp is completely collected.

The winch cables 34 pass around roof-mounted pulleys 44 and around pulleys 46 mounted to support columns 48 in the dock building, as shown in FIG. 1. They are attached at their other ends to clew plates 50. Each clew plate 50 can accommodate up to seven to fifteen winch cables 34, and is attached by a winch chain 52 to a winch 54, as shown in FIG. 1. Winches 54, draw down the clew plates 50 with the winch chains 52, enabling each approximately fifty-foot section of the frame 12 to be lifted at twelve or more points. Some of these points are shared with other sections along trusses 28 as required, as shown in FIG. 3.

In the operation of this prior art embodiment, the fumigation tent shown in the aforesaid Figures is raised by reeling in the clew plates 50 with the winches 54, such that the side curtains 18 are drawn upward by winch cables 34 via pulleys 44 and 46. As the winch cables 34 are drawn upward the horizontal pipes 30 on the first interval rise upward. This causes the rings 36 around the winch cables 34 between the first and second intervals of pipes to gather together, thus supporting and collecting intermediate portions of the side curtains 18, and thus preventing the side curtains 18 from "bagging out", i.e., overhanging, to half the height of the side walls of the tent. The rings 36, horizontal pipes 30, and pockets 32 distribute this bagout into several smaller bagouts located between the rings that surround the winch cables 34, so that the overhang created when the tarp 14 is completely gathered up is minimized, as shown in FIG. 5.

Once the first interval of horizontal pipes 30 is drawn up to the height of the second interval, the rings between the second and third intervals gather together supporting and collecting the intermediate portions of the side curtains 18. This process continues until all the horizontal pipes 30 and rings 36 are drawn up against the underside 12' of the frame 12. Once the side curtains 18 have been completely raised, and the tarp 14 collected, the winches 54 continue to draw up the winch cables 34, thus raising the frame 12. The winch cables 34 are drawn up until the frame 12 reaches a height which will enable forklift trucks to remove the pallets of produce without interfering with the fumigation tent. From the height where the side curtains 18 are completely gathered up to the height the frame 12 is finally raised to, the support cables 22, dead-tied to the roof of the dock building, become limp, i.e., in this interval the frame 12 is supported by the winch cables 34, as shown in FIG. 5.

This prior art fumigation tent is lowered by similar moves for raising the tent described above, except reversing the procedure by reversing the winches, etc. to have the cables, pulleys, etc. operate in the opposite paths as described.

Figure 6:
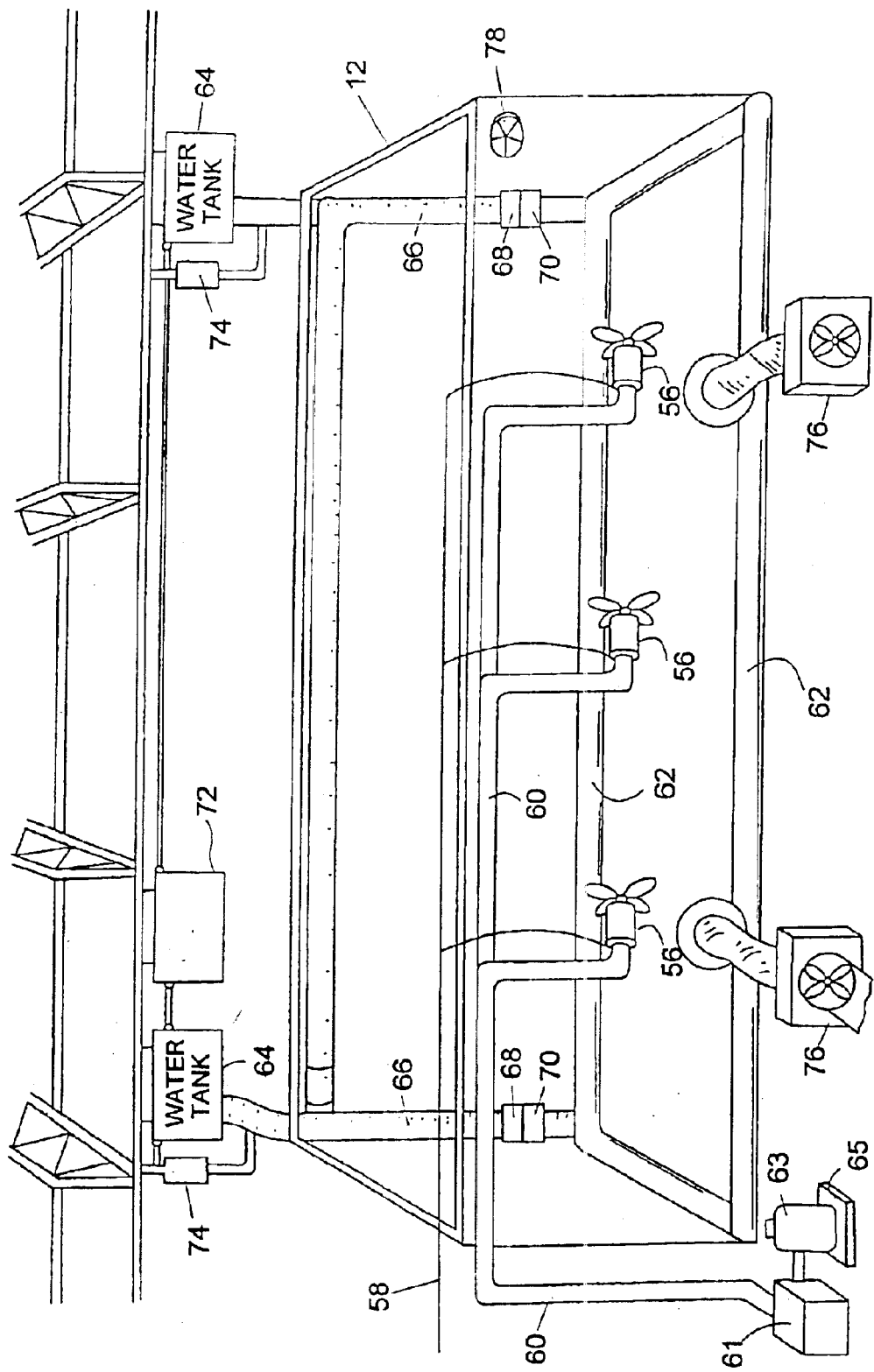
FIG. 6 shows the prior art fumigation tent described above in its lowered positioned, a water supply and removal system, circulation and exhaust fans with their associated wiring, and components of the gas supply system.

Mounting fans 56 and associated wiring 58 on frame 12 is shown in FIG. 6. Entrance hoses 60 for supplying a fumigation gas are positioned near designated fan locations to insure dispersion by mixing concentrated heated gas into the accelerated airstream provided by fans 56. A portion of these hoses rise with the tent, requiring couplings to be made with gas heaters 61 when the tent is lowered. A fumigation gas tank 63, which rests on a beam balance scale 65, supplies the fumigation gas to the heater 61. Once the tent is in place over the pallets of produce, it must be sealed to the floor of the dock building to create a substantially airtight enclosure, and thus prevent fumigation gas from escaping into the dock building during the fumigation process.

In the disclosed prior art, the method of sealing the tent to the dock floor, is to mount a flexible hose 62 along the bottom perimeter 20 of the tent and fill the hose with water, as shown in FIGS. 4 and 6. The weight of the water secures the tent to the floor of the dock building. The water can be reused by storing it in elevated tanks 64 located above the tent, preferably mounted to the roof of the dock building, as shown in FIG. 6. Collapsible flexible hoses 66 supply water from the elevated storage tanks 64 to the flexible perimeter hose 62. One-way foot valves 68 connected to the collapsible flexible hoses are employed to control columns of water to start the Venturi acceleration process for evacuation of the water from the perimeter hose 62. The foot valves 68 are by-passed by solenoid valves 70 to permit gravity filling of the hose. A compressor 72 supplies air pressure to the tops of the elevated storage tanks 64 to assist in the gravity filling of the flexible perimeter hose 62. Upon returning the water to the tanks, the compressor 72 blows the water from the hose 62 toward the foot valve location where it is carried up by the Venturi.

A water removal system is provided for evacuating the water from the flexible perimeter hose 62 comprising jet pumps 74 located above the tent, preferably mounted to the roof of the dock building, using low-mounted Venturi units which shoot the water up the collapsible flexible hoses 66 into the elevated storage tanks 64. Four distributed storage tanks limit the spilled water to one-quarter of the system's capacity. The compressor 72 can also supply air pressure through the collapsible flexible hoses 66 to assist in evacuating the water from the flexible perimeter hose 62, so that sections of the flexible perimeter hose do not collapse and trap water, thus preventing total water removal.

Once the fumigation process is complete, the fumigation gas is removed by exhaust fans 76 positioned on the floor of the dock building. These fans 76 are used to evacuate the interior of the fumigation tent before the tent is raised. Openings 78 in the tent re-introduce fresh air, as shown in FIG. 6. After approximately two hours of aeration, the tent is raised. It then takes approximately one additional hour for the fumigation gas to disperse to the level where dock personnel can enter the tent area safely.

The foregoing detailed description of the prior art preferred fumigation tent system has many advantages, and the overall concepts therein are incorporated into the present invention. However, numerous disadvantages are also inherent in the above prior art tent systems. These include:

- extra space needed overhead to store stacked the support frame above the gathered tarp. In some warehouses, dock buildings, etc. there isn't enough clearance to use this prior art system;
- costs and space involved in overhead water supply tanks and storage lines;
- time and manpower needed to install, operate and maintain overhead water storage;
- side curtains taking the weight of the side piping;
- side curtains being directly in the chain of upward forces used to lift the main frame, piping and hoses;
- inability to support inside fumigation/inspection lines when the support frame is on the outside of the tarp membrane.

Other disadvantages have been observed.

The present invention, thus, utilizes the conceptual aspects of the prior art system, such as in house ceiling suspension, winch/cable raising and lowering, and water hose bottom periphery sealing. However, in its unique features, the present invention overcomes all of the forgoing prior art shortcomings.

As will be recognized by those skilled in the art, the present invention is not limited to fumigating produce. It can be used to fumigate any article or object that can be placed under the tent. Furthermore, it is contemplated that the present invention can be adapted to be transportable.

Prior art teaches a contiguous impermeable membrane composing the top and sides of the fumigation enclosure hung under the support frame. So as not to be punctured by the support cables, the prior tarp included many support loops allowing the top of the tarp to be supported from the underside of the frame. The prior art top loop supports and the side pipe pockets once employed, approximately double the fabrication cost of the tarp.

Preferred in the present invention, the tarp is attached over the frame. This is an easier installation with the frame resting on the floor than working overhead as before. Further, with the tarp over the support frame, overall thickness of the top of the unit is reduced by almost half because of the inevitable sagging of the tarp top (roof) section is within the height of the support truss in the present invention, rather than below it as in the prior art. In the present invention, the entire system including the tarp are support truss assembly thickness may occupy only about one foot in height.

Previous systems employed custom-made flat frames for the perimeter support composed of 2 in. and 2½-in. aluminum pipe. To better resist eccentric forces around the perimeter and perpendicular bending horizontal and vertical loads, these frames have been replaced in preferred embodiments with residential commodity antenna truss. The triangle truss sections are about half of the depth of the previous frames, stiffer due to the preferred triangular constriction and about half of the cost. Reduced tube diameter and wall thickness of the truss reduce weight over the previous system allowing lifting with fewer winch units.

Figure 7A:
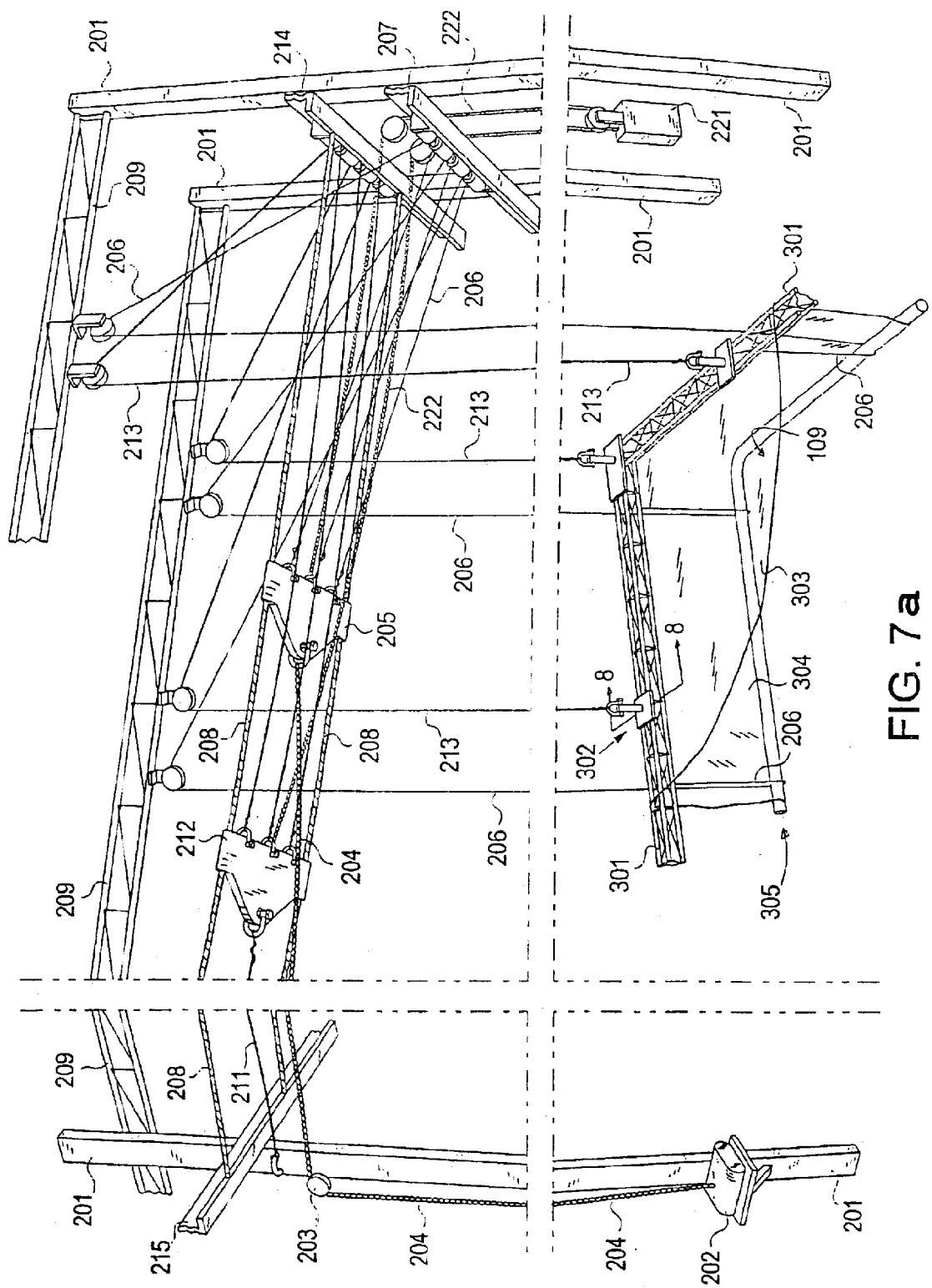
FIGS. 7a and 7b show a partial, cut, broken, perspective view a present invention mechanized fumigation tent and an exploded, partial, cut view of a present invention composite closing structure, respectively.
Figure 7B:
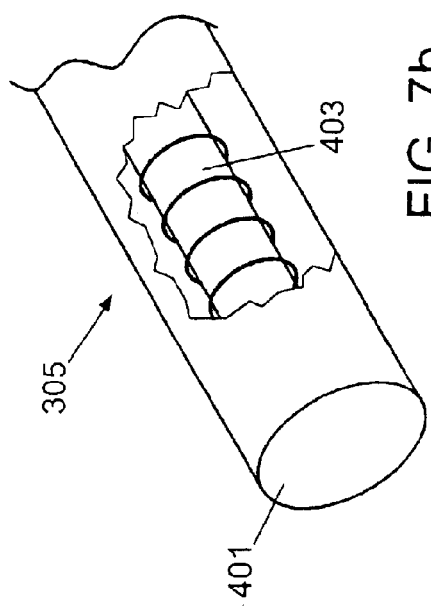

FIGS. 7*a* and 7*b* illustrates one embodiment of the present invention, which system illustrated has several virtues over the previous art. Three of the major advantages are that the system will raise the frame to the ceiling height without disconnecting or replacing with shorter lines, the dead hang low trim frame support cables; a very labor intensive activity. (In the prior art system, raising to and lowering from the ceiling was done periodically to get the prior art frame high enough to accommodate other cargo positioned below, when not in fruit fumigation season). Secondly, the suspension system and associated guide and load cables are positioned horizontally eliminating the need for vertical space above the winch equal to or greater than the distance the tent sides must be raised (eliminating the previously required higher building space for the clew to travel). Thirdly, a composite closing structure provides for sealing side curtains of a top to a floor, thereby eliminating a need for a water supply.

Thus, FIG. 7*a* illustrates a perspective view of a partial cut representation an architectural situation providing structural support as in a dock building interior. Columns 201 provide support for a winch mounting platform and winch 202. Above are cross-arms with holes 215, 214, and 207 permitting attachment of sheaves to permit cords and cables to be variously directed. These cross-arms also support the guide cables that keep the clews from twisting and insure their cooperating operations. Above are roof support bar joists permitting attachment of sheaves, such as sheave 203.

The action of the winch is to first raise the side curtains 304 of the tent up to the level of the support frame. Then further winch operation will raise the entire frame, with side curtains 304 in the raised position, on up toward the underside of the ceiling bar joist's underside. The winch 202 pulls the chain 204 down. This is translated to a horizontal pull by sheave 203. Chain 204 pulls suspension means, in this case clew 205, which is vertically supported by guide cables 208. The clew allows one cable to pull many cables such as exemplary cable 206 shown in solid lines. The pull on cords 206 is translated into various directions by the sheaves mounted on cross-arm 207.

These cords variously arrive at sheaves mounted to the underside of the several roof support bar joists 209. From these sheaves the cords drop down to touch the floor and then return part way up to the support truss frame where they are attached (dead tied). As these cords 206 pass down to the floor they pass under the bottom edge of the tarp 303 toward the inside of the side skirt. The length of the cords 206 as they reach back up to the support truss are adjusted before being dead tied such that the bottom of the side skirt will reach the floor and yet can be gathered tight to the support truss 301 when raised. When so raised, clew 205 pushes into clew 212 as the chain 204 is shortened by the winch pulling. Another suspension means in this case clew 212, remains 'part way' out on the support cables 208 by reason of the weight of the support frame 301 pulling down on cables 213

(dashed lines). The 'part way' distance is maintained by dead tie cable 211 which is anchored to the left column 201. This distance controls the height that the frame 301 is above the top of the stacks of fruit or other product. The frame is attached to the cable 213 by the FIG. 8 assembly 302 described below in more detail, which allows the tarp 303 to be sealed when over the frame 301 yet permitting the support. When the frame is raised to the ceiling for off-season storage, cable 211 goes slack because clew 212 is pushed leftward by clew 205 as the chain 204 is taken up by winch 202. To insure reliable operation, weight box 221 pulls the two clews away from one another to overcome occasional friction of the clews when in close proximity on guide cables 208. Cable 222 connects the two clews and passes around a sheave or sheaves atop the weight box 221. With the sheave support, the vertical travel of the weight is minimized as the clews move.

Composite closing structure 305 includes a circular steel structural component 403 completely encased in a foam sealing component 401, as shown in detail in FIG. 7b. Other embodiments for the composite closing structure will be discussed in hereinafter.

Figure 8:
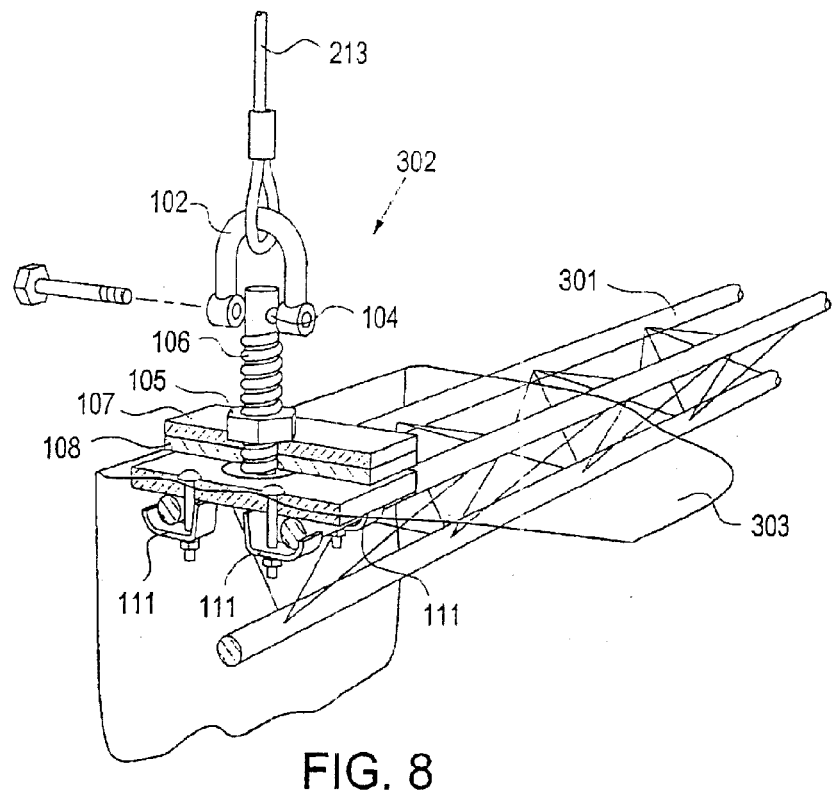

FIG. 8 shows a perspective view of one embodiment of the details of a present invention cable support and seal unit. Support cable 213 is shown, and this is the same as cable 213 of FIG. 7. These cables are, for example, spaced approximately at 15-foot intervals around the perimeter. The shackle or quick-link 102 allows fast cable detachment for service. Orifice 104 is for shackle attachment is established on thread rod 106. The lower end of the thread rod 106 is attached to base plate 112. Nut 105 compresses stiff plate 107 spreading out the area of force area against closed cell foam 108. The compressed foam area seals the plasticized tarp material against baseplate 112 of assembly 302. After the sections of the truss are connected, assemblies such as assembly 302 of FIG. 8 are placed periodically around the perimeter. The tarp 303, fabricated with sides attached, is placed over the truss frame section 301. At the installation location, a small hole is punched in the tarp top to allow passage of the thread rod and eye of assembly 302. A gas tight seal is formed by tightening the nut 105 and compressing the plate 107, foam 108, and the tarp 303 against the base plate of the FIG. 2 assembly 302.

Figure 9:
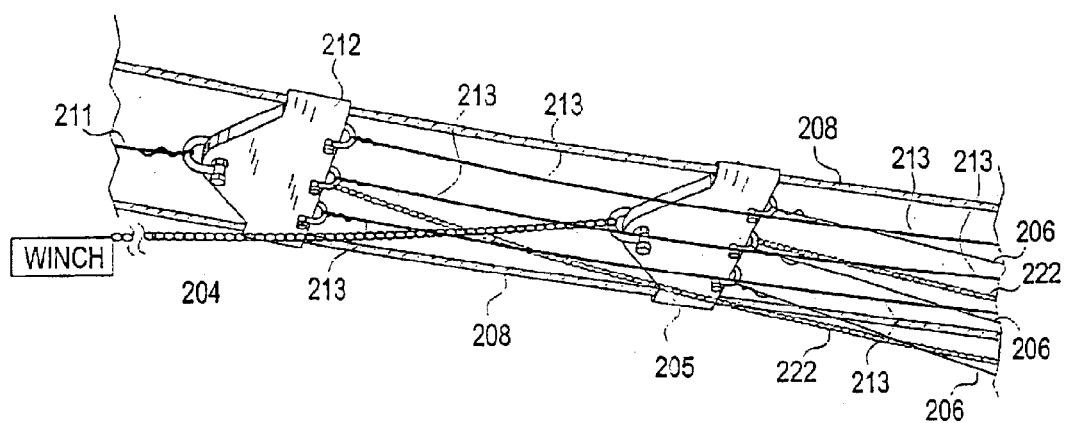
FIG. 9 shows details of the clew arrangement which can be used in the present invention.

FIG. 9 illustrates a perspective view of details of a sequential clew arrangement, which may function in the same fashion as the clews of FIG. 7. Here, guide wires 208 carry two clews, curtain clew 205 and master clew 212 referred to as master clew because it is connected to the cables connected to the support frame.)

Curtain clew 205 is connected to curtain cables 206. When curtain clew 205 is pulled to the left by cable 204 and the attached winch, it advances a distance before it contacts and touches clew 212. During this traverse, it raises curtains to a fully pulled up position. When it travels further, it also moves along clew 212 to raise up the entire support structure. Clew 212 is connected to support structure (frame) cables 212. When lowering (unwinding) the winch for the clews to move left to right, restraint line 211 stops the lowering of the frame at the desired height above the produce or other items to be fumigated. Counterweights may be included (not shown) to assure the continued movement of the clews including clew 205 away from clew 212 for complete lowering of the curtains, via counterweight chains 222.

With respect to the present invention, a plurality of clew arrangements would be utilized with coordinated, logic or computer controlled coordination of plural winch operation, or a plurality of sequential clews and a small number of winches could be utilized.

Figure 10:
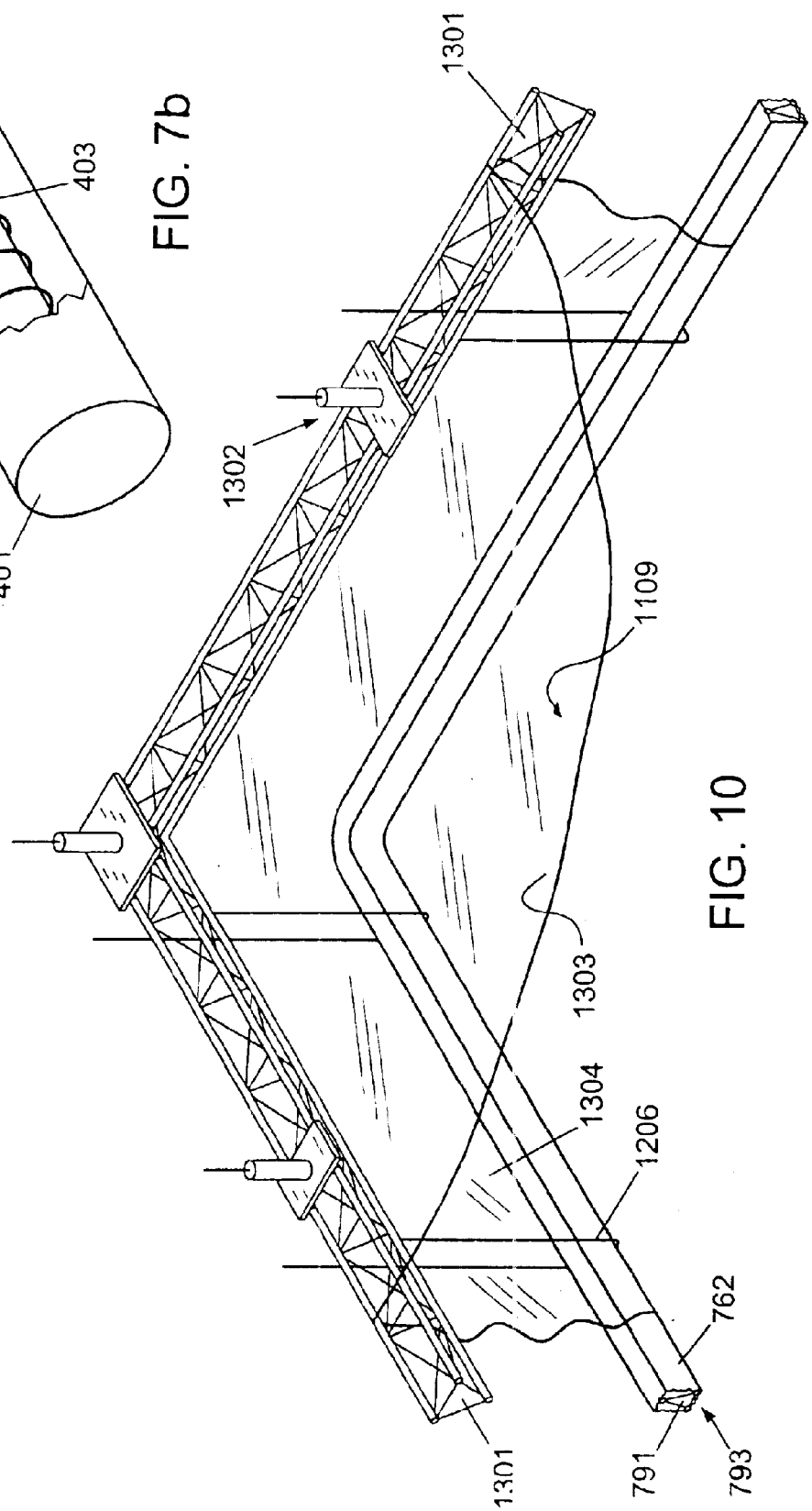
Figure 11:
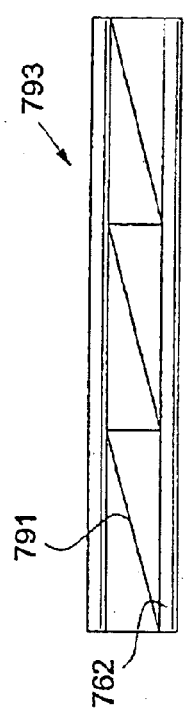
FIG. 11 shows a front view in partial cross-section thereof.

FIG. 10 and FIG. 11 show a present invention composite closing structure 793 for sealing the bottom perimeter of curtains 1304. The composite closing structure 793 is connected to the bottom perimeter of the side curtains 1304, as shown and explained herein above in the description of FIG. 7a. Similar parts to those shown in FIG. 7a are similarly numbered, but beginning with "1000".

The composite closing structure 793 has at least a first component and second component. The first component is a structural support component 791 and has sufficient rigidity to flex no greater than 6 inches over a 10-foot length with a fulcrum weight of 100 pounds. As shown in FIG. 10 and FIG. 11, the structural support component 791 has a triangular cross section. However, other embodiments of the structural support component cross section include circular, square, rectangular, hexagonal, and the like. The structural support component 791 may be made from metal, wood, plastic, and the like.

The second component is a sealing component 762 and is formed of flexible material. The sealing component 762 may be flexible hosing, flexible synthetic foam, flexible rubber and the like. It may be located exterior to the structural support component or encase the structural support component. As shown, the sealing component 762 is a flexible base, which may be mounted along the bottom perimeter of the side curtains 1304 and encasing the structural component. When the structural component is in place with the sealing component to form a composite closing structure, the composite closing structure will seal the tent to a floor.

Figure 12:
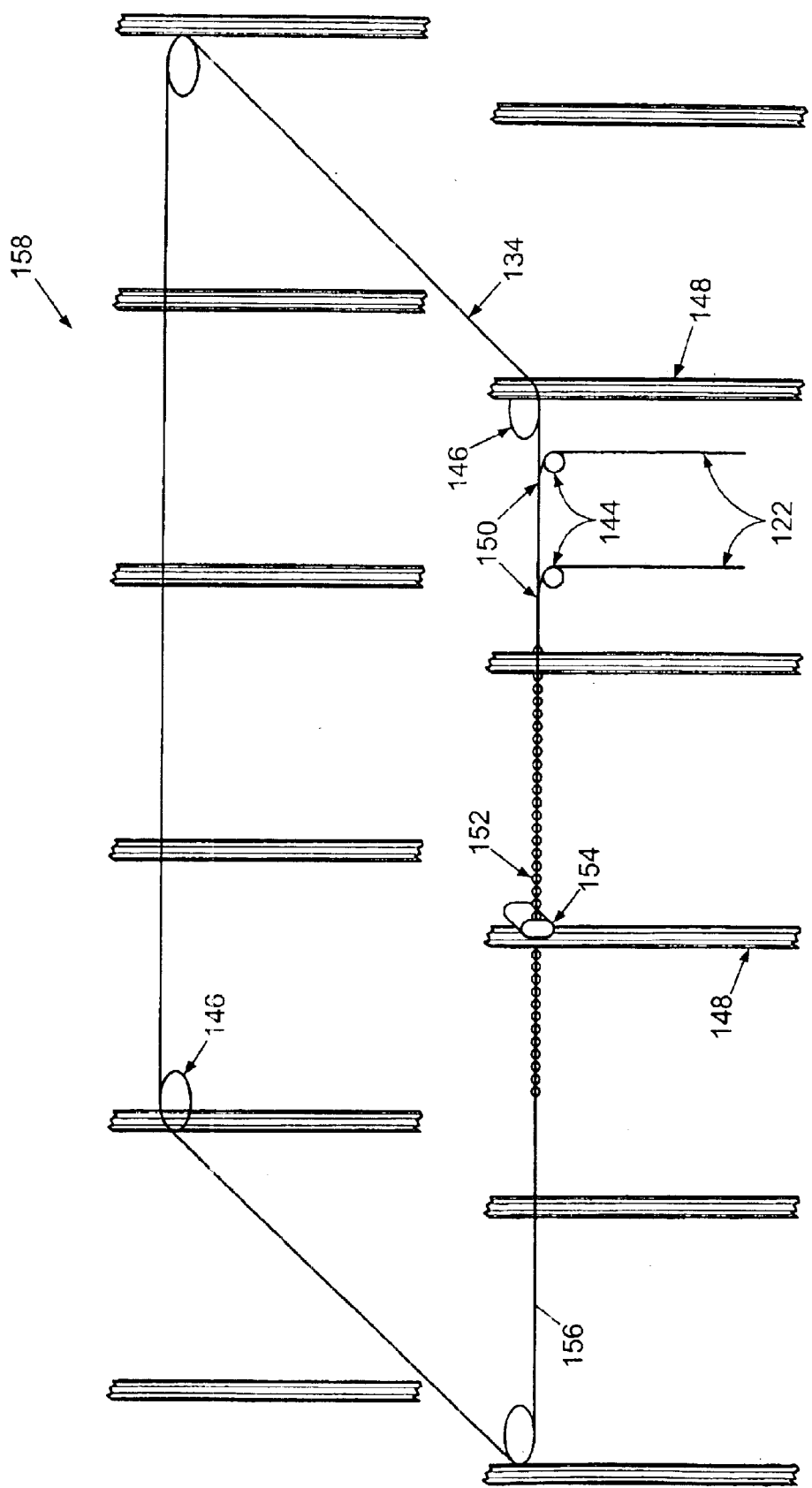
FIG. 12 shows a perspective cut view of another loop support system for raising and lowering a cable support means.

FIG. 12 shows a perspective cut view of a loop support system 158 for raising and lowering a cable support means. The system 158 includes a motorized winch 154 of the same type as the winch 54 of FIG. 1. The motorized winch 154 is in effect a distributed clew in that one cable pull moves many smaller cables at the same rate.

As shown in FIG. 12, the winch 154 may be located near the top of a column 148 and is positioned to pull horizontally. The column 148 is one of a plurality of stationary columns in a warehouse and the loop support system may be positioned around any and/or all of the stationary columns. A pull of a load chain 152 is connected to a cable or a plurality of rods 156 or chains, which form a loop 134 reaching around the columns 148 or other supports 144, which returns to a rear side of the winch 154. A plurality of larger sheaves 146 support the loop 134 at points of turning in a horizontal plane.

The load chain 152, which is drawn through the pulling side of the winch 154, is exuded from the rear side. Opposite ends of the loop 134 of rods 156 or chains are connected to the two ends of the load chain 152 such that, as the load chain 152 is pulled through the winch 154 from the load end, constant loop tension is maintained by simultaneously increasing the distance of the exit chain from the rear of the winch 154. Viewed from the top, the loop 134 moves first clockwise and then counter clockwise as the winch motor first "raises" and then "lowers" its chain, actually pulling horizontally.

There are a plurality of small sheaves 144 that are stationary and fixed in position periodically, tangent to the travel of the loop 134. A plurality of light cables 122 are attached by attachment means or fixings 150 to the loop 134 in various locations around the upper perimeter of the enclosure that travel vertically outside the tarpaulin and turn horizontally through the plurality of small sheaves 144. "Raise" or pull motion of the winch 154 moves the loop 134 clockwise, as viewed form the top, and the near side fixings move leftward causing the load on small cables 122 to be raised. The reverse happens for "lower" causing the loop 134 to move counterclockwise. The direction of the raise and lower motions may also be in reverse, i.e. counterclockwise direction and clockwise direction, for raising and lowering, respectively.

This system 158 has the capability of being operable co-operatively with the clew system before referenced in FIGS. 7a, 7b, 8 and 9, via electrical interlock means, or independently. Additionally, for ease of hardware maintenance, all the components of the system are located in an easily accessible location, which is not blocked by the tarpaulin bag or having a long reach over the top of the tarpaulin bag.

The loop system 158 for raising and lowering may be employed for adjusting the height of an enclosure support frame only, of side walls of the tarpaulin only, of a sealing means structure only, or any combinations thereof.

Figure 13:
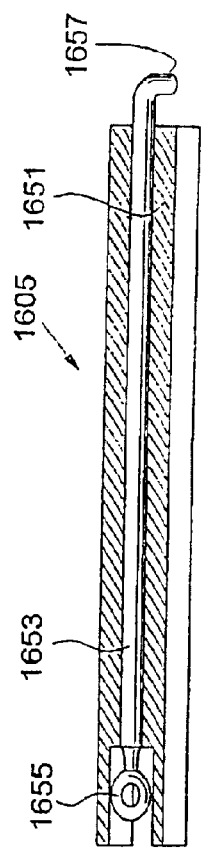
FIG. 13 and FIG. 14 show side cross sectional views of two composite closing structures of the present invention, each having a hook and eyelet for removeably connecting each composite structure.
Figure 14:
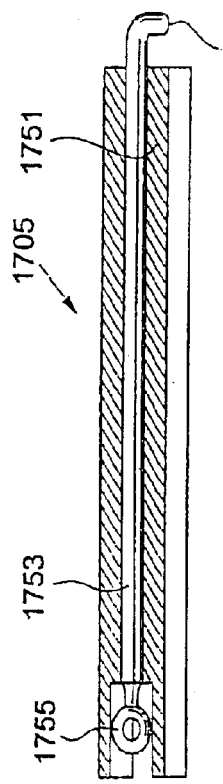

FIG. 13 and FIG. 14 show side cross sectional views of another embodiment of a present invention composite closing structure 1605 and 1705, respectively. The composite closing structure 1605 includes a sealing component 1651 and a structural support component 1653. The structural support component includes a hook 1657 and an eyelet 1655, on each end of the structural support component 1653, for removably connecting each composite closing structure 1605, 1705 to at least one other composite closing structure. The hook 1657 and the eyelet 1655 may be reversed having the hook protruding from the composite closing structure 1605 and the eyelet located within the composite closing structure 1605.

The composite closing structure 1705 shown in 14 is similar to that described in FIG. 13. Similar components are similarly numbered to those described by FIG. 13, but beginning with "1700".

Figure 15:
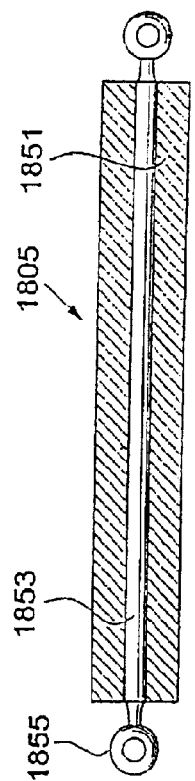
FIG. 15 shows a side cross sectional view of another embodiment of a composite closing structure of the present invention, having eyelets on each end for removably connecting each composite closing structure to mating composite closing structures.

FIG. 15 shows a side cross sectional view of another embodiment of a composite closing structure 1805 of the present invention. The composite closing structure 1805 includes a sealing component 1851 and a structural support component 1853. The structural support component 1853 has a link 1855 for removably connecting each composite closing structure 1805 to a hook structural support component.

FIG. 16a and FIG. 16b show a vertical section, and a horizontal section of a composite closing structure 1905 of the present invention, having eyelets 1955 with a hooking/connecting means 1959 inserted for allowing a cable loop end 1960 to surround the hooking means 1959. As shown, there is an eyelet 1955 at both ends of the structural support member. The eyelets 1955 may be removeably connected to the structural support component 1953 for ease of maintenance to repair perimeter damage.

Each eyelet 1955 is offset horizontally by one-half of an eyelet thickness to permit the eyelet 1955 holes to line up for insertion of the hooking means 1959 for hooking the cable loop 1960 to the hooking means 1959. The hooking means may be a thru-bolt, a nut and pin, a screw, and the like.

As shown, the hooking means 1959 is a thru-bolt. The offset positioning of the eyelet 1955 allows the sealing component or elastomeric covering 1951 to line up axially to permit a continuous sealing pressure on the bottom perimeter of the side wall membrane. The sealing component 1951 makes a butt seal at the eyelets' 1955 joints where the entrance of cable 1960 having a loop end passes around the thru-bolt 1959. The surrounding of the thru-bolt by the cable 1960 loop permits support of the bottom perimeter of the composite closing structures 1905 without tension loading of the plastic tarpauling membrane, if desired.

The support cables 1960 may be controlled and threaded thru sheaves for support in a manner like those cooperating from the clew 205 in FIG. 9, which are employed in raising the side curtains of the enclosure. If it is desired to lift the sealing system separately from the bottom of the tarpaulin perimeter, there may be a third clew including a plurality of lifting cables or a loop system with cables 122 as shown in FIG. 12.

Figure 17:
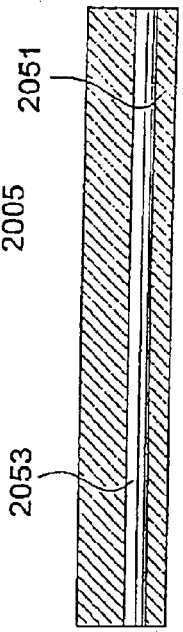
FIG. 17 shows a side cross sectional view of another embodiment of a composite closing structure of the present invention having an integral structural support component.

Referring now to FIG. 17, there is shown a side cross sectional view of another embodiment of a composite closing structure 2005 of the present invention. The composite closing structure has a single structural support component 2053 within a single sealing component 2051. Note that the structural support component 2053 can be located in any placement within the sealing component 2051.

Figure 18:
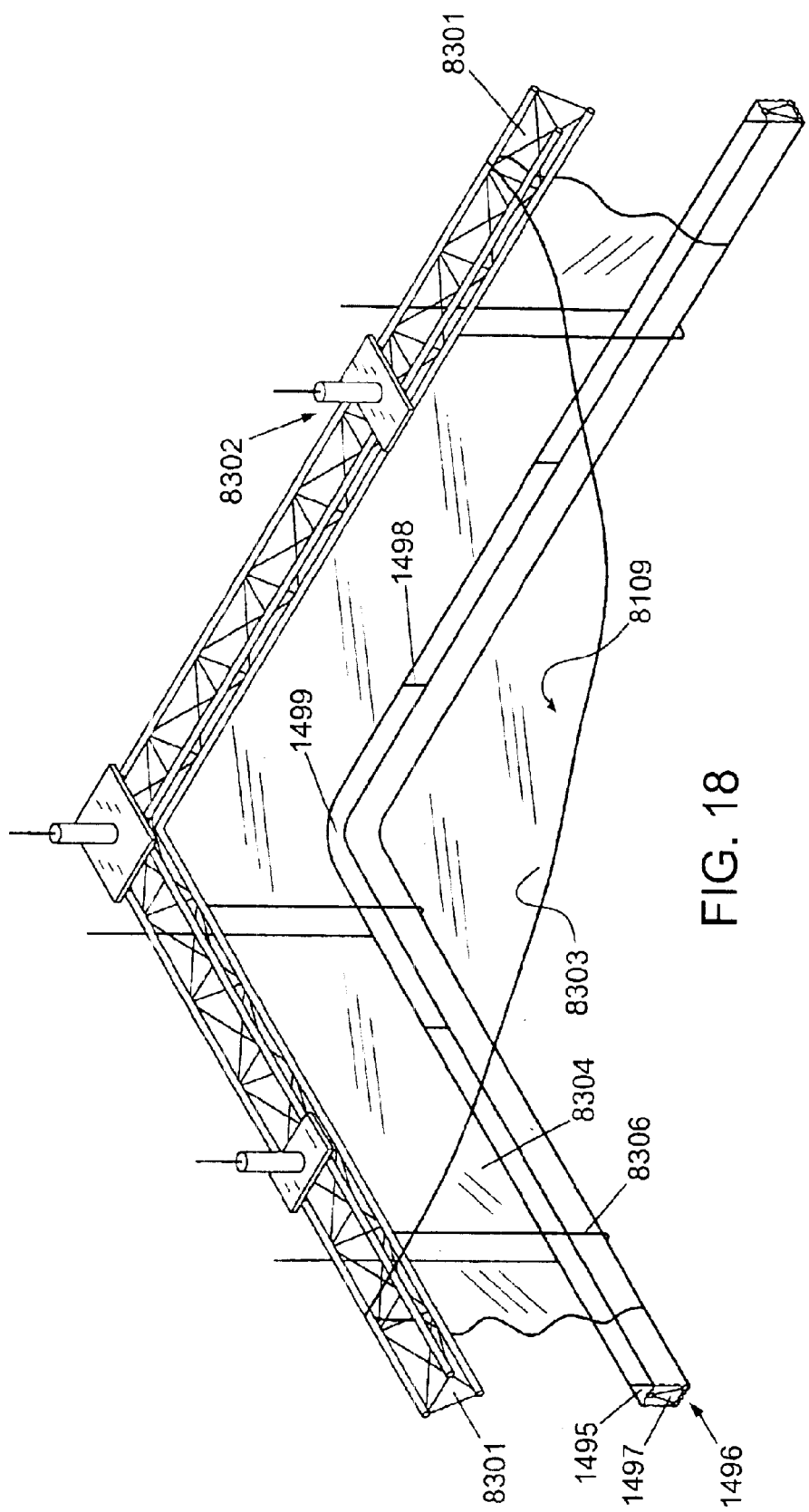
FIG. 18 shows a partial, cut perspective view of a composite closing structure for sealing the bottom perimeter of curtains, having a structural support component external to a sealing component.

FIG. 18 shows a partial, cut perspective view of a composite closing structure for sealing the bottom perimeter of curtains, having a structural support component external to a sealing component. Identical parts to those shown in FIG. 10 are numbered similarly, but beginning with "8000".

In this embodiment, the structural support component 1495 includes at least one metal rod or truss, which is connectable to the sealing component 1497 through connecting means 1498. In this case, the connecting means 1498 is a plurality of ties extending from within the sealing component 1497, which are tied around the structural support component 1495. In addition, there may be at least one flexible joint 1499 between multiple structural support components 1495.

Figure 20:
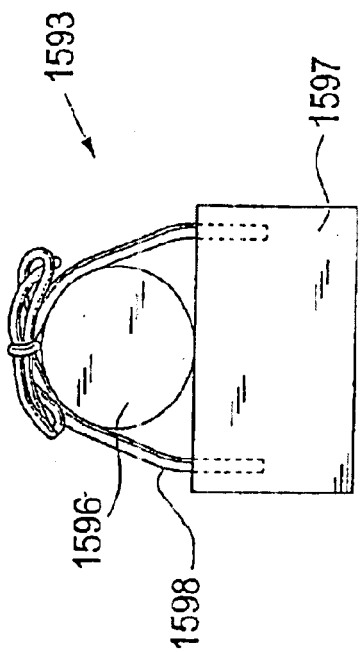
FIG. 19 and FIG. 20 show side views of a present invention composite closing structure which may be used in combination with the fumigation tent shown in FIG. 18.
Figure 19:
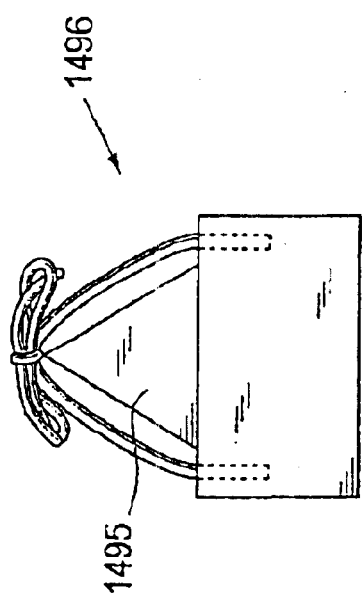

FIG. 19 and FIG. 20 show side views of a present invention composite closing structure 1496 and 1596, respectively, which may be used in combination with the fumigation tent shown in FIG. 18. In FIGS. 18 and 19, the structural support component 1496 has a triangular cross-section while in FIG. 19, the structural support component 1596 has a circular cross-section. In FIG. 20, identical parts to those shown in FIG. 19 are similarly numbered, but beginning with "1500".

Obviously, numerous modifications and variations of the present invention are possible in light of the above teachings. For example, any type of connecting means may be used for connecting the structural component to the sealing component, or vice versa. Moreover, the structural support component may be connected in any position relative to the sealing component, i.e., above, within, adjacent or below. It is therefore understood that within the scope of the appended claims, the invention may be practiced otherwise than as specifically described herein.

What is claimed is:

1. A mechanized fumigation tent, which comprises:

(a) an overhead structure;

(b) a support frame having a top;

(c) a tarp mounted atop said frame and hanging from said frame to define a top and side curtains, said side curtains having a lower periphery which defines a bottom perimeter;

(d) a first plurality of cables, being curtain cables, and communicating with said overhead structure and being connected to said side curtains and adapted for raising and lowering said side curtains relative to said support frame;

(e) a second plurality of cables, being frame cables, and communicating with said overhead structure and being connected to said frame and adapted to raise and lower said curtains by raising and lowering said first plurality of cables, and so as to raise and lower said frame and tarp by raising and lowering said second set of cables;

(f) mechanized cable moving means for moving said first plurality of cables and said second plurality of cables so as to raise and lower said curtains by raising and lowering said first plurality of cables, and so as to raise and lower said frame and said tarp by raising and lowering said second plurality of cables; and (g) a composite closing structure being connected to said bottom perimeter of said side curtains for physically compressing against a floor, wherein said composite closing structure seals said bottom perimeter of said side curtains, said composite closing structure having at least a first component and a second component, said first component being a structural support component and having sufficient rigidity to flex no greater than 6 inches over a 10 foot length with a fulcrum weight of 100 pounds, and said second component being a sealing component and being formed of flexible material, such that when said structural component is located one of within and abutting said sealing component and is lowered to a floor, said composite closing structure will seal said tent to said floor.

2. The mechanized fumigation tent of claim 1 wherein said sealing component is selected from the group consisting of flexible hosing, flexible synthetic foam, flexible rubber and rubber foam.

3. The mechanized fumigation tent of claim 2 wherein a cross-sectional shape of said structural support component is selected from the group consisting of circular, triangular, rectangular, and hexagonal.

4. The mechanized fumigation tent of claim 3 wherein said structural support component is selected from elongated metal sections, elongated wood sections and elongated plastic sections.

5. The mechanized fumigation tent of claim 1 wherein said structural support component is at least one integral metal rod.

6. The mechanized fumigation tent of claim 1 wherein said structural support component is selected from the group consisting of a plurality of metal rods and a plurality of trusses wherein each one of said metal rods and said trusses have connecting means for connecting one said structural support component to another said structural support component.

7. The mechanized fumigation tent of claim 6 wherein said connecting means is selected from the group consisting one of eyelets and hooks, interlocking links, eyelets and thru-bolts for attachment of a cable, and combinations thereof.

8. The mechanized fumigation tent of claim 1 wherein said structural support component is embedded within said sealing component.

9. The mechanized fumigation tent of claim 1 wherein said structural support component is removably connected to said sealing component.

10. The mechanized fumigation tent of claim 1 wherein a flexible joint is located between said structural support components.

11. The mechanized fumigation tent of claim 1 wherein said mechanized cable moving means is at least one winch.

12. The mechanized fumigation tent of claim 11 wherein said first plurality of cables and said second plurality of cables are each connected to suspension means that is connected to said at least one winch.

13. The mechanized fumigation tent of claim 12 wherein said suspension means is at least one clew.

14. The mechanized fumigation tent of claim 1 wherein said first plurality of cables and said second plurality of cables are each connected to suspension means that is connected to said mechanized moving means.

15. The mechanized fumigation tent of claim 14 wherein said suspension means is at least one clew.

16. The mechanized fumigation tent of claim 1 wherein said second plurality of cables is connected said support frame by an attachment arrangement which penetrates said tarp top.

17. The mechanized fumigation tent of claim 1 wherein said first plurality of cables is connected to a first suspension means and said second plurality of cables is connected to a second suspension means, said first suspension means is connected to said mechanized moving means and said first suspension means is connected to said second suspension means whereby said first suspension means may be moved a first distance to raise raise said side curtains and may also be moved an additional distance to functionally simultaneously move said second suspensions means therewith to effect raising of said support structure and tarp.

18. The mechanized fumigation tent of claim 17 wherein said first suspension means is a first clew and said second suspension means is a second clew.

19. The mechanized fumigation tent of claim 18 wherein said mechanized cable moving means is at least one winch.

* * * * *